Nov. 28, 1967   C. V. ARMOND   3,354,655
AUTOMATICALLY OPERATED DOOR FOR WATER CONTROL
Filed Sept. 17, 1965   3 Sheets-Sheet 1
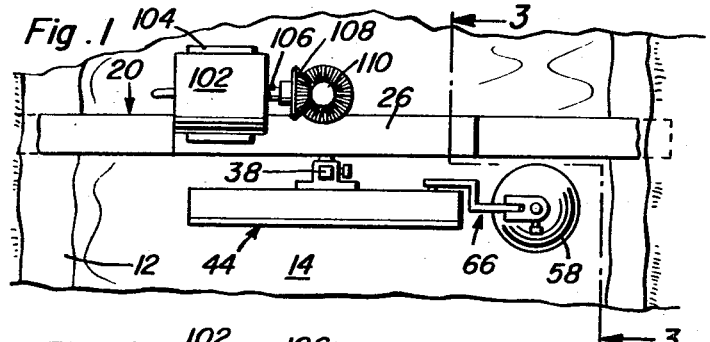
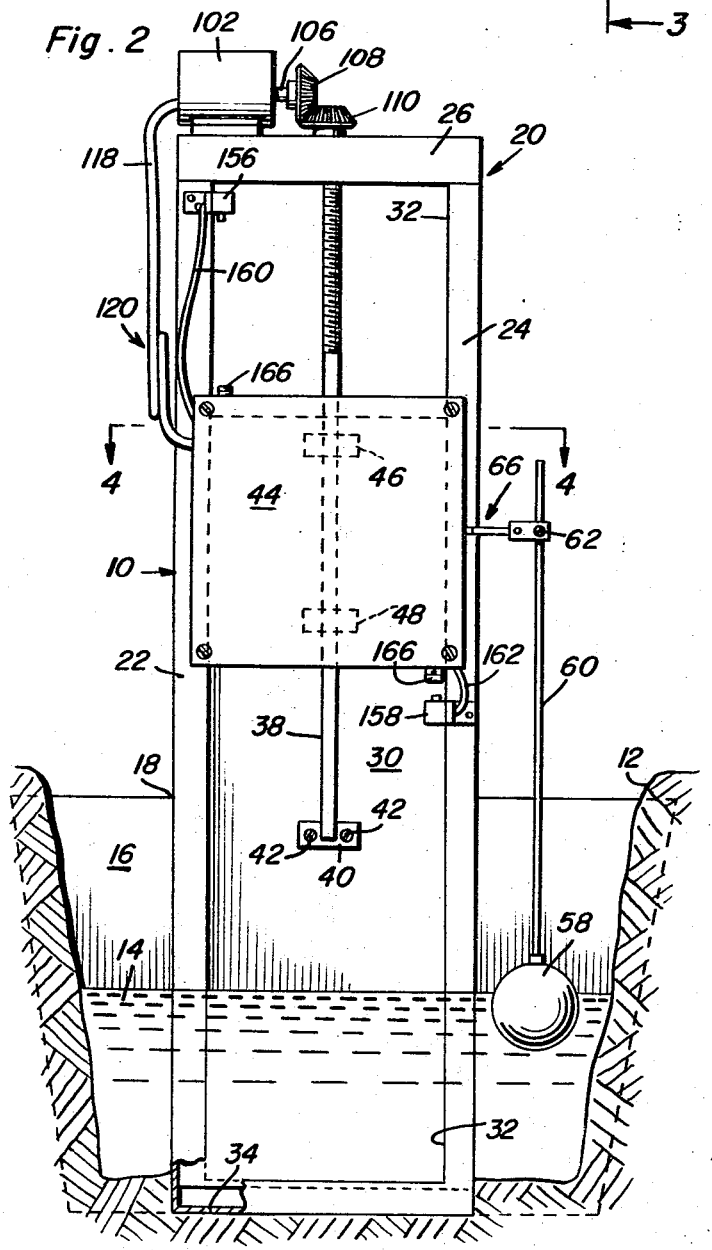
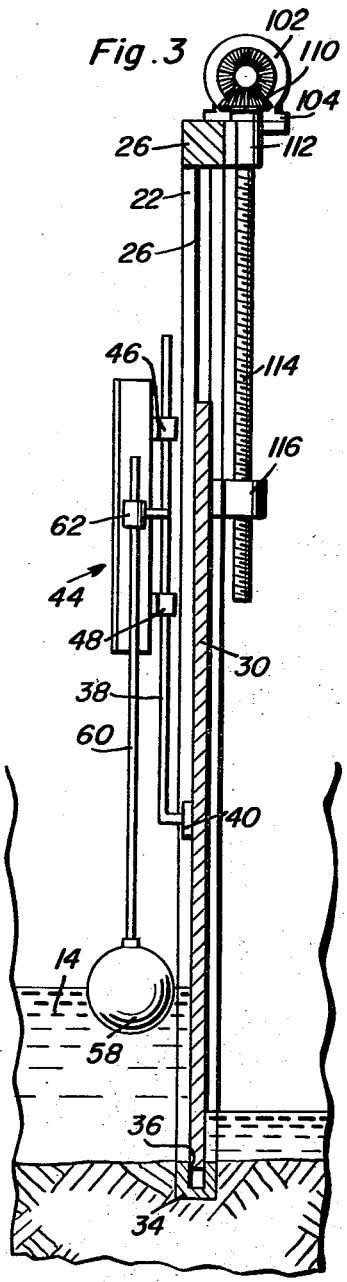
Charles V. Armond
INVENTOR.

Nov. 28, 1967   C. V. ARMOND   3,354,655
AUTOMATICALLY OPERATED DOOR FOR WATER CONTROL
Filed Sept. 17, 1965   3 Sheets-Sheet 2

Charles V. Armond
INVENTOR.

Nov. 28, 1967     C. V. ARMOND     3,354,655
AUTOMATICALLY OPERATED DOOR FOR WATER CONTROL
Filed Sept. 17, 1965     3 Sheets-Sheet 3
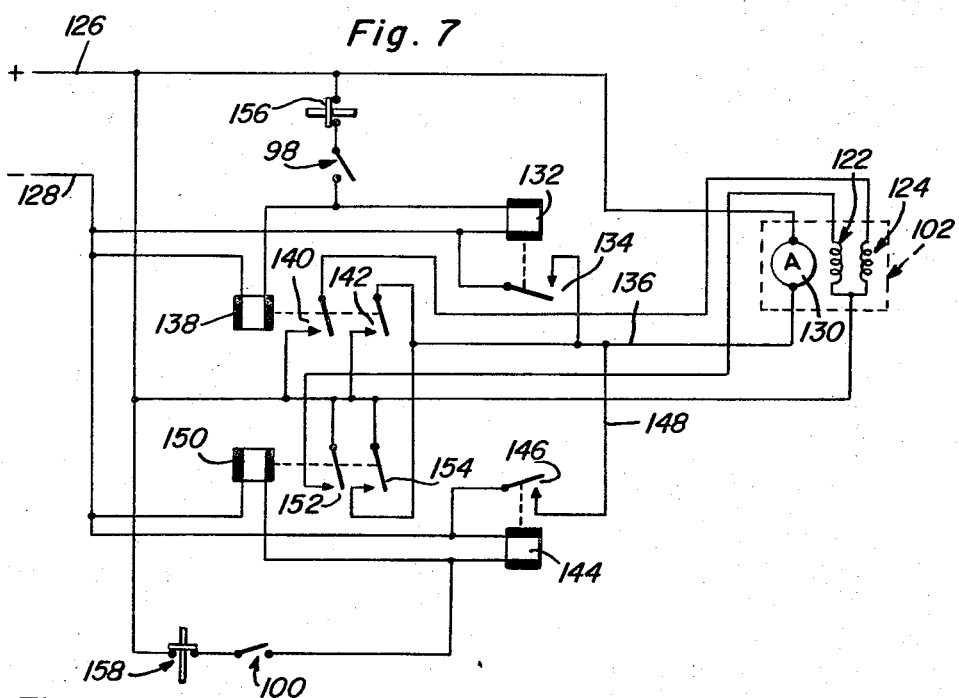
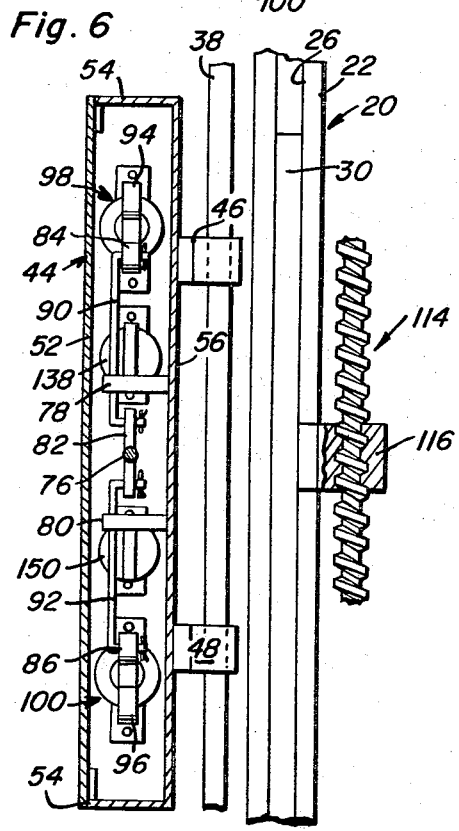
Charles V. Armond
INVENTOR.

United States Patent Office
3,354,655
Patented Nov. 28, 1967

3,354,655
AUTOMATICALLY OPERATED DOOR FOR WATER CONTROL
Charles V. Armond, Yorba Linda, Calif. (117 N. Richman, Fullerton, Calif. 92632)
Filed Sept. 17, 1965, Ser. No. 487,988
10 Claims. (Cl. 61—28)

ABSTRACT OF THE DISCLOSURE

A flow controlling gate mounted by a frame within a channel for vertical movement to vary the flow area of an opening by means of a reversible motor. The gate carries a float controlled motor control assembly through which operation of the motor is controlled in order to reduce the rate at which the water level in the channel rises or drops by accordingly varying the position of the gate.

This invention relates to a water flow control system and more specifically to control apparatus for vertical lift water control gates useful for automatically regulating the flow of water to farm irrigation systems or in canal, river, reservoir or basin irrigation or flood control systems.

It is an object of the instant invention to provide an automatic control system for use with water gates.

It is a further object of the present invention to provide an electrically operated automatic control system for vertical lift water control gates which may be installed on existing gates or on newly constructed gates.

It is a still further object of the present invention to provide a float operated automatic water control system which is extremely compact, of simple design and low of cost as well as being substantially trouble-free in operation requiring little or no maintenance.

It is another object of the present invention to provide electrically operated water control gates including means for automatically raising and lowering the gate in direct response to the water level in the water system as well as safety means for cutting off the electrical operation thereof in case of malfunctioning.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a water control gate incorporating the features comprising the present invention;

FIGURE 2 is a front elevational view similar to that of FIGURE 1 of the water control gate and apparatus of the present invention;

FIGURE 3 is a vertical sectional view taken substantially on the plane of the line 3—3 of FIGURE 1;

FIGURE 6 is a vertical sectional view taken substantially on the plane of the line 6—6 of FIGURE 5; and FIGURE 7 is a schematic diagram of the electrical circuit associated with the apparatus of the present invention.

Figure 4:
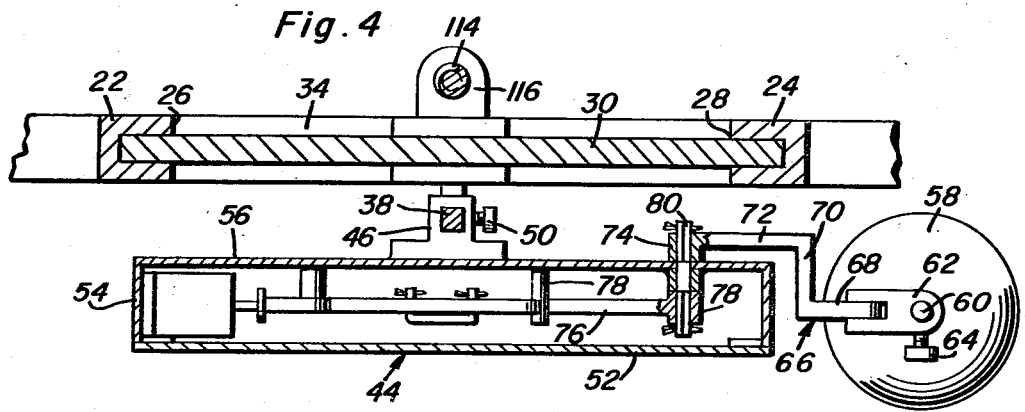
FIGURE 4 is an enlarged horizontal cross-sectional view taken substantially on the plane of the line 4—4 of FIGURE 2.

Referring now to the drawings in greater detail, reference numeral 10 refers generally to an automatically operated gate or door 10 for water control. As may be observed in FIGURES 1–3, a dam or wall 16 is conventionally mounted transversely of the channel 12 and includes a substantially centrally located opening 18 therein in which is mounted the frame structure generally denoted by reference numeral 20. It will be appreciated, of course, that the channel 12 may be an irrigation ditch or other channel in which water normally flows, with the flow thereof normally unimpeded by man-made obstacles. However, as is conventional in the art, dams or walls containing control gates therein are normally constructed in such channels in order to control the rate and amount of water flow therethrough in order to provide for the efficient usage of the water for irrigation or likewise for flood control purposes.

The frame structure 20 includes a pair of upstanding side frames 22 and 24 connected at the top thereof by a horizontally disposed cross frame member 26. Also included as part of the frame structure is a bottom mounted frame member 34. With reference to FIGURE 4, it may be observed that the vertical oriented side frame members 22 and 24 are of generally U-shaped or channel-like configuration and provide tracks 26 and 28 in which a gate 30 is mounted for vertical sliding movement. As may be observed in FIGURE 2, for example, the frame 20 provides an opening or water passageway 32 therein, and the door 30 is of somewhat lesser length than the opening thereby permitting the passage of water through the opening 32 when the door 30 is raised upwardly in tracks 26 and 28. The bottom frame member 34 also is of channel-like configuration for receiving the gate 30 therein when the gate is in its lowermost or closed position.

Referring again to FIGURES 1–3, it will be readily observed that the door 30 includes an upstanding rod 38 mounted on one face thereof by mounting bracket 40. The bracket 40 is fastened to the door 30 by conventional fastening means 42. The rod 38 is a substantially L-shaped member, as may be observed in FIGURE 3, and is of generally square cross section. The rod 38 has mounted thereon a control box generally denoted by reference numeral 44 by the mounting clamps 46 and 48. The mounting clamps 46 and 48 are attached to the rear side of control box 44 in conventional fashion, as for example by being welded or screwed thereon and include setscrews 50 therein so that the control box may be positioned vertically on the rod 38 and fixed in various positions thereon by tightening down the setscrews 50.

The control box 44 is generally square in vertical cross section and is preferably constructed of rather thin gauge metallic material such as sheet steel or the like. The control box 44 includes a front cover 52 which is removably mounted on the side walls 54 thereof in order to provide access to the interior of the control box and a back wall 56 to complete the enclosure.

A float 58 is mounted on the end of float rod 60 for response to the level of water 14 on the side of the dam or wall 16 on which the control box 44 and float 58 are mounted. The float rod 60 is mounted in a mounting clamp 62, which mounting clamp is provided with a setscrew 64 in order to provide vertical adjustment of the rod 60 therein and to allow the rod 60 to be fixedly mounted in the clamp 62 by tightening down of the setscrew 64. Attached to the clamp 62 is an external swing arm generally denoted by reference numeral 66. The arm includes a first portion 68 extending laterally of the clamp 62, a second portion 70 extending perpendicularly to the first portion 68, a third portion 72 extending perpendicularly to the second portion 70 and parallel to the first portion 68. The arm 66 terminates in a journal portion 74 which is mounted in the back wall 56 of the control box 44 for rotation therein. Mounted within the control box 44 is an internal swing arm 76 having a journal portion 78 on one end thereof similar to journal portion 74 of swing arm 66. The journal portion 78 is retained in fixed engagement with the journal portion 74 by a stem 80, which stem is fixed therein by a pair of conventional cotter pins thereby fixing the journal portion 78 to the journal portion 74 for rotation therewith. Thus, it is apparent that when the float 58 moves in response to a change in the level of water 14, the rod 60 will impart the movement of the float 58 to the swing arm 66, which arm will cause the journal portion 74 to rotate in wall 56 and thus the internal swing arm 76 will also rotate in response to movement of the float 58. A pair of stops 78 and 80 are mounted on the back wall 56 of control box 44 and extend outwardly into the path of travel of arm 76 in order to limit the rotational movement of that arm.

Figure 5:
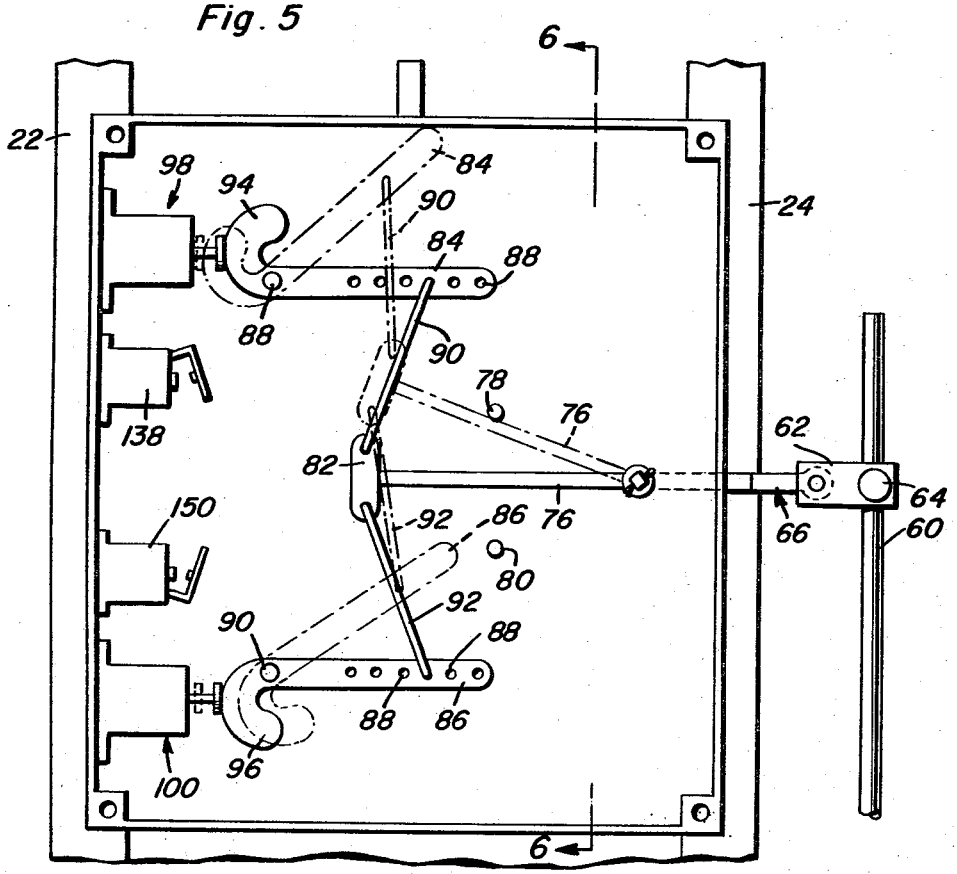
FIGURE 5 is a partial front elevational view of the apparatus of the present invention corresponding to the view of FIGURE 4.

Mounted on the end of internal swing arm 76 opposite the journal portion 78 is a mounting plate 82. A pair of swing bars 84 and 86 are rotatably mounted on pivot pins 88 and 90 which pins are fastened to the back wall 56 of the control box 44. The swing bars 84 and 86 include a plurality of mounting holes 88 therein. A pair of link rods 90 and 92 extend between the mounting plate 82 and the swing arms 84 and 86 and are fastened thereto by cotter pins in order to move the swing arms 84 and 86 about pivots 88 and 90 in response to movement of the internal swing arm 76. The plurality of mounting holes 88 are provided in order to facilitate use of different length link rods so as to vary the length of the arc through which the swing bars 84 and 86 will swing in response to movement of the internal swing arm 76. Thus, it may be observed in FIGURE 5 by the lines in ghost therein that movement of the internal swing arm 76 will cause the swing arms 84 and 86 to rotate about pivot pins 88 and 90.

The swing arms 84 and 86 include camming heads 94 and 96 thereon on the ends thereof opposite the ends to which link rods 90 and 92 are attached. The camming heads 94 and 96 operate to control the opening and closing of a pair of similar microswitches generally denoted by reference numerals 98 and 100. These switches comprises a portion of the electrical circuitry of the present invention to be described more fully below.

Accordingly, in view of the foregoing description it will be observed that the structure included in control box 44 will operate the electrical circuitry of the present invention in response to movement of the float 58, which in turn is moved in response to raising or lowering of the level of water 14 behind the door 30. An electric motor 102 is mounted on the horizontally disposed cross member 26 by mounting plate 104. The motor 102 includes an output shaft 106 having a beveled pinion gear 108 on the end thereof for intermeshing with a matching bevel gear 110. The bevel gear 110 is mounted on the horizontal cross frame member 26 for rotation in the journal member 112 which also is mounted on the horizontal frame member 26. A worm drive shaft 114 is connected to the gear 110 for rotation therewith and extends downwardly therefrom as illustrated in FIGURES 3 and 6. The door 30 includes a drive shaft follower member 116 mounted on the back face thereof and in which the drive shaft 114 is received. When the motor 102 operates thereby turning output shaft 106 and gears 108 and 110, the drive shaft 114 will also be turned, thereby causing the door 30 to move either upwardly or downwardly along the drive shaft 114 as the drive shaft follower member 116 rides upwardly or downwardly on shaft 114. Of course, the direction in which the door 30 is driven is dependent upon the direction of rotation of output shaft 106. The electrical circuitry of the present invention referred to generally above is contained in the control box 44 and is schematically illustrated in FIGURE 7. The electrical components of the invention are connected to the electric motor 102 by wires contained in conduits 118 which conduit 118 includes a slack portion 120 in order to allow the door 30 to raise or lower in the frame 20.

Referring now to FIGURE 7 for a description of the electrical circuitry of the present invention, it will be observed that the motor 102 is a reversible shunt field electric motor including reversely wound field coils 122 and 124 which allow the motor 102 to operate in opposite directions. The motor 102 is connected to a source of electrical energy over leads 126 and 128, and preferably operates on a 220-volt source. However, as will be appreciated, a 440-volt source may be used if desired. The motor 102 conventionally includes an armature 130, which armature is directly wired to the positive electrical terminal by lead 126. The electrical circuit actually includes two similar circuits wired together for compactness and simplicity, which circuits present a normally open circuit to the motor 102. The first circuit includes normally open microswitch 98 which is closed by movement of the cam head 94 described above. When the microswitch 98 is closed, a single-pole relay 132 is energized, thereby closing the switch 134, thus closing the circuit to the armature 130 over lead 136. At the same time, the closing of microswitch 98 also energizes the double-pole relay 138, which relay includes switches 140 and 142. When energized, the relay 139 closes switches 140 and 142 thus completing the circuit to field coil 124 thereby causing the motor 102 to be energized and output shaft 106 to rotate in a first direction. It will be appreciated that the components of the second circuit will not be effected by the closing of microswitch 98 and thus microswitch 98 effects operation of the motor 102 in only one direction. By referring to FIGURE 3, it will be observed that the door 30 is in its closed position, and the float 58, rod 60 and internal swing arm 76 are in the neutral position, thus maintaining the circuit in de-energized condition and the motor 102 is inoperative.

Referring again to FIGURE 7, if microswitch 100 is closed rather than microswitch 98, the single-pole relay 144 is energized thus closing switch 146 and allowing the armature circuit to be energized through lead 148. Further, the double-pole relay 150 will also be energized, thus closing switches 152 and 154, thus completing the circuit through field coil 122, thereby causing the motor 102 to operate in the reverse direction to that described above. Thus, with reference to the above description and by further reference to FIGURE 3, it will be observed that a predetermined positional relationship between the level of water 14 behind the gate 30 and the position of the gate will cause the float 58, rod 60 and internal swing arm 76 to be maintained in neutral position, thereby maintaining switches 98 and 100 in their open condition and the circuit motor in inoperative condition. However, if the level of water 14 were to rise and thereby change this predetermined relationship, the float 58 would, of course, move upwardly in response thereto, and the swing arm 76 downwardly. At this time, the microswitch 100 will be closed, the motor 102 energized and the gate 30 raised to allow water to flow through opening 32 tending to reduce or stop the rise in the water level. The door 30 is moved upwardly tending to restore the positional relationship so that the float 58 and float rod 60 will cause the internal swing arm 76 to be moved back to neutral position, thus opening the switch 100 and shutting off the motor. This operation will enable water to move from the left side of the gate 30, in viewing FIGURE 3, to the right side of the gate. If the water level were then to fall, the float would, of course, respond thereto and the camming heads 94 or 96 be moved in accordance therewith to close switch 98 and the motor energized accordingly. Thus, it will be obvious that the gate 30 will automatically move within limits in response to changes in the level of water 14 until said predetermined relationship is restored.

There is also included in the circuitry of the present invention a pair of normally closed limit switches 156 and 158 which are positioned on the side frames 22 and 24 and connected by wire leads 160 and 162 to the electrical circuit. The switches 156 and 158 are responsive to pressure and will be opened by the abutments 164 or 166 which are mounted on the door 30. The switches 156 and 158 are provided to limit movement of the gate 30, thus protecting the gate and the switching mechanism from damage. Thus, it will be observed by viewnig FIGURE 2 that the door 30 is adjacent its lowermost position and by virtue of the position of swing arms 66 the circuit would normally be open. However, when the abutment 166 reached the switch 158 the circuit would be opened and thus the motor would be rendered inoperative causing the gate to stop.

In view of the foregoing description, it will be apparent that the automatically operated gate for water control comprising the present invention provides means for regulating the amount of water which will flow through a channel opening which is automatically responsive to the level of water in the channel and which operates to turn itself on and off in response to changes in such water level.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A system for regulating change in level of a fluid body comprising flow controlling gate means through which fluid from said fluid body may flow to reduce the level thereof, drive means connected to the gate means for positioning thereof to control the flow rate of said fluid, and control means connected to the drive means for varying the flow rate in response to changes in a predetermined positional relationship between the level of said fluid body and the position of the gate means, said control means including fluid level sensing means mounted by the gate means and movable therewith by the drive means.

2. A system for controlling water flow through a channel comprising frame means positioned substantially transversely in said channel, said frame means including a water flow opening therein, gate means mounted for vertical movement in said frame means for closing a portion of said opening, means for moving said gate means in said frame means, means for controlling the operation of said moving means, said control means being responsive to the level of water in said channel whereby said gate means may be positioned to either open or close said opening in said frame means, said control means including a float operatively connected to said gate means for response to the level of water in said channel, swingable arm means positioned on said gate means for movement in response to movement of said float, a pair of control circuits, normally open switch means in each of said control circuits, said arm means positioned to close either of said switch means thereby activating one of said control circuits, and each said control circuit being connected to said motor for operation of said motor in a different direction.

3. The combination of claim 2 wherein said moving means comprises reversibly operable motor means mounted on said frame means, means connecting the output of said motor to said gate means for moving said gate means in response to operation of said motor whereby said gate means will be raised or lowered dependent upon the direction of operation of said motor.

4. The combination of claim 3 including a control box, said control box containing said switch means, said control circuit and said arm means, said control box being adjustably mounted on said gate means whereby the initial position of said float with respect to said channel is adjustable.

5. The combination of claim 2 including a control box, said control box containing said switch means, said control circuits and said arm means, said control box being adjustably mounted on said gate means whereby the initial position of said float with respect to said channel is adjustable.

6. In combination with a water conveying channel having a flow regulating gate therein, a control system for automatically regulating the flow of water through said channel for automatic movement of said gate in response to the water level in the channel, the improvement comprising means for mounting the gate in substantially transverse vertically movable position in said channel, float means responsive to the water level in said channel, said float means being operatively connected to said gate on one side thereof, means for moving said gate in said mounting means, control means operatively connected to said moving means for controlling the operation of said moving means, said control means being operatively connected to said float means for response to the position thereof.

7. The improvement of claim 6 wherein said moving means comprises a motor positioned on said mounting means, said motor including an output shaft, gear means mounted on said mounting means for rotational response to said output shaft, means on said gate in engagement with said gear means for response thereto whereby said gate means may be moved in said mounting means by rotation of said motor.

8. The improvement of claim 7 wherein said motor includes a pair of reversely wound shunt field windings whereby said motor may be operated in either of two directions.

9. The improvement of claim 7 wherein said control means includes a float mounted on said gate means for response to the level of water in said channel, swingable arm means positioned on said gate means for movement in response to movement of said float means, a pair of control circuits, normally open switch means in each said control circuit, said arm means positioned to close either of said switch means in response to movement of said float thereby activating one of said control circuits, and each said control circuit being connected to a separate oppositely wound field coil in said motor whereby said motor may be operated in either of two directions.

10. The combination of claim 8 including a control box, said control box containing said switch means, said control circuits and said arm means, said control box being adjustably mounted on said gate means whereby the initial position of said float with respect to said channel is adjustable.

References Cited

UNITED STATES PATENTS

| | | | |
|---|---|---|---|
| 2,041,576 | 5/1936 | Sulsdorf | 61—28 |
| 2,932,171 | 4/1960 | Ranson | 61—28 |
| 2,979,909 | 4/1961 | Broadbent | 61—28 |

REINALDO P. MACHADO, *Primary Examiner*